W. A. ROESKE.
LEVEL AND TUBE HOLDER THEREFOR.
APPLICATION FILED OCT. 16, 1918.

1,348,742.

Patented Aug. 3, 1920.

WITNESS
Alfred J. Bratton

INVENTOR
William A. Roeske

Victor J. Evans
ATTORNEY.

UNITED STATES PATENT OFFICE.

WILLIAM A. ROESKE, OF McKEE CITY, NEW JERSEY.

LEVEL AND TUBE-HOLDER THEREFOR.

1,348,742.

Specification of Letters Patent.

Patented Aug. 3, 1920.

Application filed October 16, 1918. Serial No. 258,373.

*To all whom it may concern:*

Be it known that I, WILLIAM A. ROESKE, a citizen of the United States, residing at McKee City, in the county of Atlantic and State of New Jersey, have invented new and useful Improvements in Levels and Tube-Holders Therefor, of which the following is a specification.

The invention relates to spirit levels and plumb beams, and has for an object to provide a level and more particularly a holder for the usual spirit tube employed with the level, whereby the spirit tube holder can be more cheaply and quickly manufactured, and applied to the plumb beam or level bar with the use of less stripping or metal or other fastening materials than are now usually employed.

Among other features, the invention comprehends a spirit tube holder which is preferably formed from a tubular section having the usual sight or peep-opening, with ends of the tubular section cut and slit to form perpendicular flanges, constituting fastening bars or strips for facilitating the fastening of the holder to the plumb beam.

Still further my invention comprehends various improvements in levels as set forth in United States Letters Patent #1,213,020, granted to me under date of January 16, 1917.

In the further disclosure of the invention, reference is to be had to the accompanying drawing, constituting a part of this specification, in which similar characters of reference denote corresponding parts in all the views, and in which—

Figure 1:
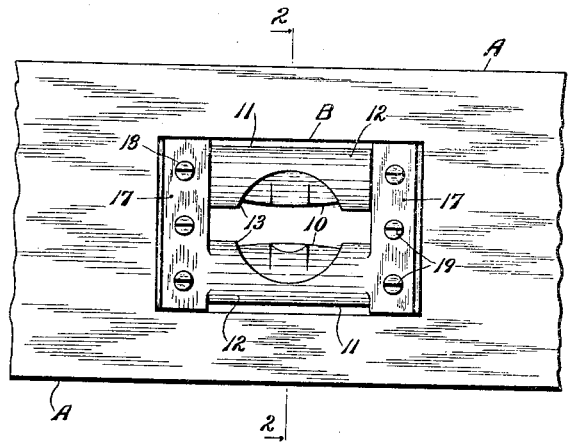
Figure 1 is a front elevation of a level embodying my invention.
Figure 2:
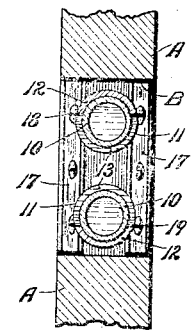
Fig. 2 is a fragmentary vertical sectional view taken on the line 2—2 in Fig. 1.
Figure 3:
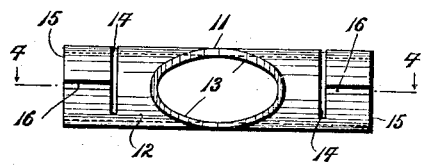
Fig. 3 is an elevation of the holder by itself, showing the initial procedure in forming the same.
Figure 4:
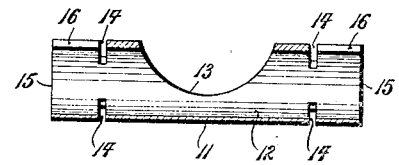
Fig. 4 is a vertical sectional view taken on the line 4—4 in Fig. 3.
Figure 5:
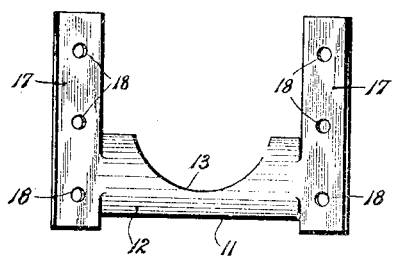
Fig. 5 is a side elevation of the holder being the reverse of what is shown in Fig. 3, and disclosing the holder in its completed form before application to the level proper.
Figure 6:
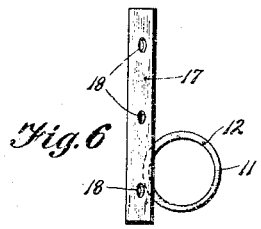
Fig. 6 is an end view of the holder as shown in Fig. 5.

Referring more particularly to the views, I have designated the level by the letter A, and the usual elongated opening therein by the letter B, with the spirit tube indicated by the numeral 10. The spirit tube is contained in a holder 11 which is formed by a tube or tubular section 12, having a centrally formed sight opening 13, with circumferential slits 14 cut into the tube adjacent the ends thereof, said slits or saw cuts being made to only partially sever the ends 15 from the body of the tube. The partially severed ends 15 are now slit longitudinally by means of saw cuts or slits 16, the slits 16 being at right-angles to the circumferential saw cuts 14, and when this has been accomplished the ends can be unrolled or flattened out to form flat elongated flanges or strips 17, which are provided with suitable countersunk openings 18 for the admission of screws 19, whereby the holder can be secured to the level proper A, and lie in and traverse the elongated opening B thereof, this being accomplished after the spirit tube 10 has been initially placed in the completed holder.

Referring to my Patent #1,213,020, it will be seen that the holders 9 after having received the spirit tube 10, and are placed upon the level body to traverse the elongated opening B thereof, must be secured by additional securing strips 6, 7. It has been found that this construction involves additional material, namely, securing strips, and that the holder is not seated and secured as rigidly as might be with my new construction set forth herein, and whereby the securing strips are an integral part of the holder, being formed directly with the tube section, which is later adapted to contain and support the spirit tube.

From the foregoing description it will be seen that the holder described consists essentially of a single piece of material, namely, a tube section, which is formed with diametrical and longitudinal slits, whereby the end portions of the tube section can be unrolled and straightened out to form securing strips, thus greatly facilitating the manufacture of the tube section; the application of the completed tube holder to the level body, and particularly insuring greater rigidity and accuracy in the manufacture of a spirit level or plumb beam.

I claim:

As a new article of manufacture a spirit level tube holder comprising a single piece of tubular material having a central sight opening and having the end portions thereof provided with diametrical slits and longitudinal slits communicating with the diametrical slits, forming partially severed pieces integral with the tubular portion, said pieces being flattened out with portions extended farther to one side of the tubular portion than to the other, said pieces being bent at angles to said tubular portion and away therefrom.

In testimony whereof I affix my signature.

WM. A. ROESKE.